(12) United States Patent
Chiaroni et al.

(10) Patent No.: US 6,433,902 B1
(45) Date of Patent: *Aug. 13, 2002

(54) OPTICAL SWITCH

(75) Inventors: Dominique Chiaroni, Antony; Dominique De Bouard, Ste Genevieve des Bois; Michel Sotom; Francesco Masetti, both of Paris, all of (FR)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 08/940,995

(22) Filed: Sep. 30, 1997

(30) Foreign Application Priority Data

Oct. 7, 1996 (FR) .............................................. 96 12190

(51) Int. Cl.$^7$ .............................................. H04B 10/00
(52) U.S. Cl. ....................................... 359/117; 359/128
(58) Field of Search ................................ 359/117, 128, 359/165, 139, 124; 370/372, 362; 385/16, 17

(56) References Cited

U.S. PATENT DOCUMENTS

| | | | | |
|---|---|---|---|---|
| 5,341,234 A | * | 8/1994 | Suzuki et al. ................ | 359/117 |
| 5,400,162 A | * | 3/1995 | Newberg et al. ............. | 359/117 |
| 5,504,610 A | * | 4/1996 | Bulow .......................... | 359/173 |
| 5,510,921 A | * | 4/1996 | Takai ........................... | 359/124 |
| 5,542,010 A | * | 7/1996 | Glance ......................... | 385/14 |
| 5,937,117 A | * | 8/1999 | Ishida et al. .................. | 385/24 |
| 5,953,142 A | * | 9/1999 | Chiaroni ...................... | 359/127 |
| 6,026,204 A | * | 2/2000 | Chbat .......................... | 385/24 |

OTHER PUBLICATIONS

Ishida, O. "Parallel–Optical–Interconnecting Multi–wavelength Star Network (POIMS Net) for the Ultimate in High–capacity Switching", IEEE/LEOS 1996 Summer Topical Meetings, Aug. 1996, pp. 65–66.*

Atsushi Watanabe et al, "Optical path Cross–Connect Node Architecture with High Modularity for Photonic Transport Networks", IEICE Transactions on Communications, vol. E77–B, No. 10, Oct. 1, 1994, pp. 1220–1229.

F. Masetti et al, "Optical Fiber Buffer for High–Performance Broadband Switching", European Transactions on Telecommunications and Related Technologies, vol. 4, No. 6, Nov. 1, 1993, pp. 671–679 XP000433724.

* cited by examiner

Primary Examiner—Jason Chan
Assistant Examiner—Agustin Bello
(74) Attorney, Agent, or Firm—Sughrue Mion, PLLC

(57) ABSTRACT

A switch which avoids imparting interference noise, limiting communications speed, and imparting losses, includes n passive couplers, each of which is provided with a number k of outlets, and with an inlet suitable for receiving one input signal; and k wavelength multiplexers, each of which is provided with n inlets set to respective ones of n wavelengths. For each multiplexer, that one of its inlets which is set to one of the wavelengths, is coupled via an amplifying optical gate to one of the outlets of that one of the couplers that is organized to receive an input signal carried by the same wavelength. The switch is used in performing routing functions in communications networks having optical links.

7 Claims, 2 Drawing Sheets

OPTICAL SWITCH

The invention relates to transmitting data by using optical links. It relates more particularly to optical switches used in communications networks equipped with this type of link. Such switches serve in particular to perform routing functions in the network.

BACKGROUND OF THE INVENTION

Generally, optical switches are designed for selectively directing one or more optical signals received from one or more transmission lines to other lines as a function of a command. The switch may be a purely space-division switch. It may also be a time-division switch, i.e. capable of selectively delaying the input signals by durations that vary as a function of the command. Time-division switches are used in particular to resolve contention in packet-switching systems.

Unfortunately, currently-known switches suffer from drawbacks. In particular, they impart interference noise, they have limitations as regards speed of switching, and they impart losses.

OBJECTS AND SUMMARY OF THE INVENTION

An object of the invention is to remedy the above drawbacks. To this end, the invention provides a switching apparatus for selectively transmitting n input optical signals to one or more outlet ports as a function of a direction command, the input signals having the form of modulated optical waves that have different respective wavelengths, the apparatus including:

n passive couplers, each of which is provided with a number of outlets equal to the number k of the outlet ports, and with at least one inlet suitable for receiving one of the input signals; and k wavelength multiplexers, each of which is provided with an outlet constituting one of the outlet ports, and with n inlets set to respective ones of the wavelengths;

and for each multiplexer, that one of its inlets which is set to one of the wavelengths is coupled via an amplifying optical gate to one of the outlets of that one of the couplers that is organized to receive an input signal carried by the same wavelength.

The invention thus implements a space-division switch in which each input signal can be directed to one or more outlet ports. By means of the presence of amplifying optical gates, i.e. optical amplifiers generally optimized for enabling gain to be varied rapidly as a function of an electrical or an optical command, the power per channel can be maintained at an appropriate level. Furthermore, the fact that switching is performed by on/off control of the gates makes it possible to simplify control. In addition, the use of optical gates makes rapid switching possible, and gives a high isolation ratio, the isolation ratio being defined as the ratio between the output signal power when the gate is conducting and the output signal power when the gate is blocked.

Another major advantage is the absence of interference noise. This is due to the fact that the waves applied to the inputs of the multiplexers have wavelengths that are all different, and that the multiplexers act as filters. For a given channel, each multiplexer eliminates the amplification noise of the other channels. This advantage would not be achieved if mere couplers were used instead of multiplexers. Another advantage of the presence of the multiplexers in the circuit proposed is that the signal-to-noise ratio for each channel is independent of the number of channels directed to the same outlet. Finally losses are reduced to as low as possible, and all these properties enable a high bit-rate to be achieved.

In a variant embodiment, the apparatus includes n wavelength converters suitable for delivering respective ones of the input optical signals as a function of external optical signals having the form of modulated optical waves having arbitrary wavelengths.

In this way, the presence of wavelength converters removes any constraint as regards the wavelengths of the external signals to be directed. Advantageously fixed wavelength converters are used so as to guarantee carrier stability.

The invention also provides a time-division switch enabling any signal applied to one of its inlets to be directed to one or more of its outlets, each outlet delivering an output signal that is delayed relative to the input signal, with a delay that can be varied as a function of the applied command. For this purpose, in the apparatus at least k–1 outlets of each coupler are connected to respective ones of the inlets of the multiplexers via optical delay lines dimensioned to create propagation delays that are all different.

Advantageously, each delay line is placed so as to connect one of the outlets of a coupler to one of the optical gates.

Finally, the invention provides a space-and-time-division switch implemented by putting a time-division switch of the invention and a space-division switch of the invention in cascade.

BRIEF DESCRIPTION OF THE DRAWINGS

Other aspects and advantages of the invention appear from the following description given with reference to the figures, in which.

MORE DETAILED DESCRIPTION

Figure 1:
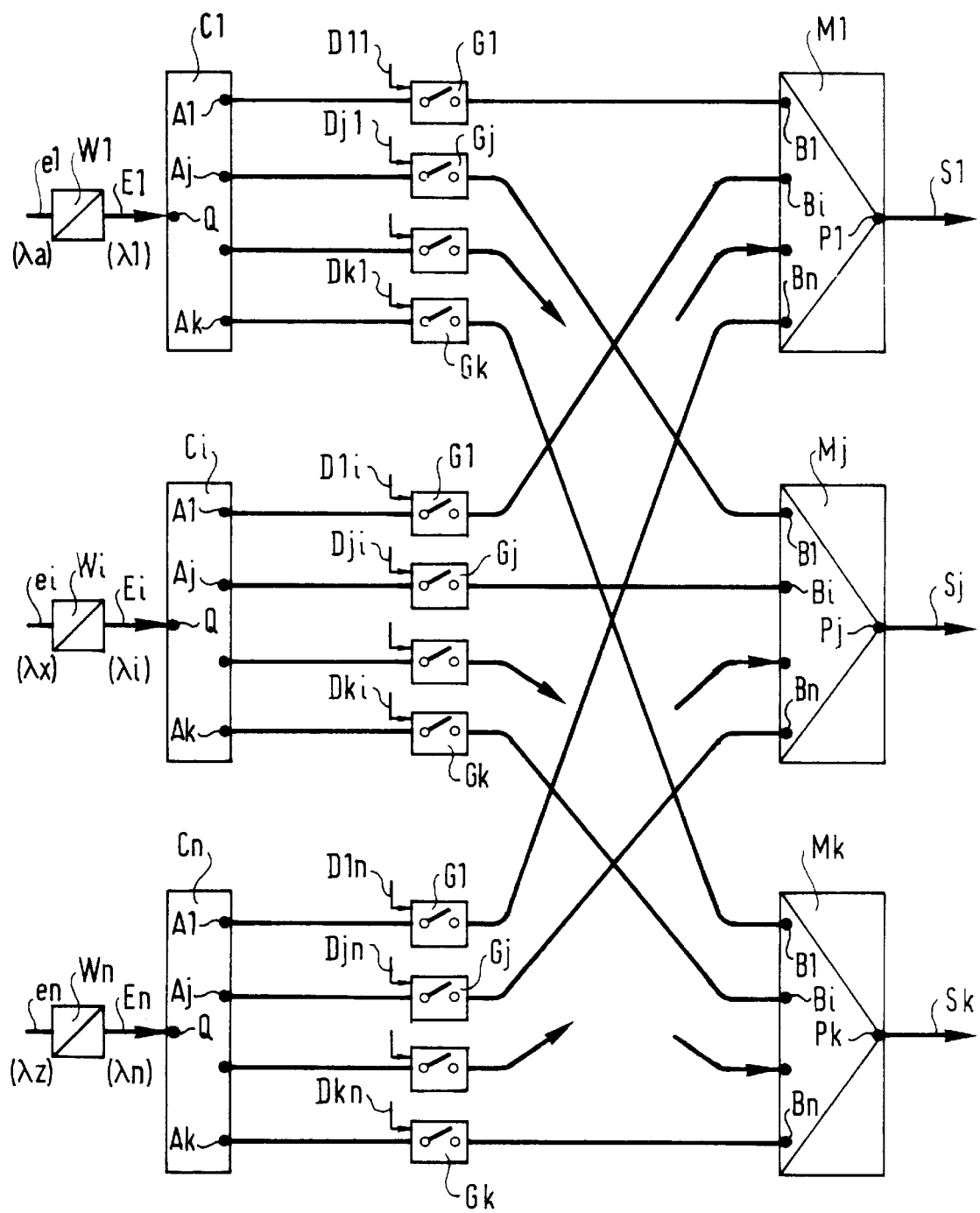
FIG. 1 shows space-division switching apparatus of the invention.

The switch shown in FIG. 1 includes a number n of couplers C1, Ci, Cn, and a number k of multiplexers M1, Mj, Mk. Each coupler such as Ci is provided with an inlet port Q and with k outlet ports A1, Aj, Ak. The inlet ports Q of the couplers are organized to receive input signals E1, Ei, En carried by respective wavelengths $\lambda 1$, $\lambda i$, $\lambda n$ via a suitable optical link. These wavelengths $\lambda 1$, $\lambda i$, $\lambda n$ correspond respectively to the carriers of communications channels, and they are therefore mutually different enough to be separated by commonly used multiplexers.

Each of the multiplexers M1, Mj, Mk is provided with a respective outlet port P1, Pj, Pk, the outlet ports being organized to transmit the respective output signals S1, Sj, Sk. Each multiplexer Mj is provided with n inlets B1, Bi, Bn set respectively to the wavelengths $\lambda 1$, $\lambda 1$, $\lambda n$ of the input signal carriers. This means that a multiplexer designed in this way and used as a demultiplexer would make it possible to separate a wavelength multiplex input via the port Pj into a plurality of components available at the ports B1, Bi, Bn, the components respectively having the wavelengths $\lambda 1$, $\lambda i$, $\lambda n$.

The inlets B1, Bi, Bn of each multiplexer Mj are coupled to respective ones of the outlets Aj of the couplers C1, Ci, Cn, via amplifying optical gates G J. Each of the gates Gj may be constituted by an optical amplifier whose gain is switchable by means of an electrical or optical control signal Dji so as to make it function either as an attenuator or as an amplifier. Advantageously, a stabilized-gain optical amplifier is used having a structure as defined, for example, in European Patent Application EP-A-639876, published on Feb. 22, 1995.

The signals D11, Dj1, Dkl, Dli, Dji, Dki, . . . , DKn, constitute the commands for controlling switch direction. Thus, as a function of the control signals applied to the various gates, it is possible to direct each input signal Ei to any outlet port P1, Pj, Pk, or to any set of outlet ports.

Clearly, the apparatus can operate correctly only on condition that the carriers of the input signals E1, Ei, En have wavelengths $\lambda 1, \lambda i, \lambda n$ that are specifically determined and that are placed within respective wavelength bands that are authorized by the inlets B1, Bi, Bn of the multiplexers.

To overcome this constraint, and in a variant of the invention, wavelength converters W1, Wi, Wn are advantageously provided that are coupled to the respective inlets Q of the couplers C1, Ci, Cn. The converters W1, Wi, Wn are organized such that, as a function of respective external signals e1, ei, en carried by arbitrary wavelengths, they deliver the input signals E1, Ei, En carried respectively by the wavelengths $\lambda 1, \lambda i, \lambda n$ imposed by the multiplexers.

Figure 2:
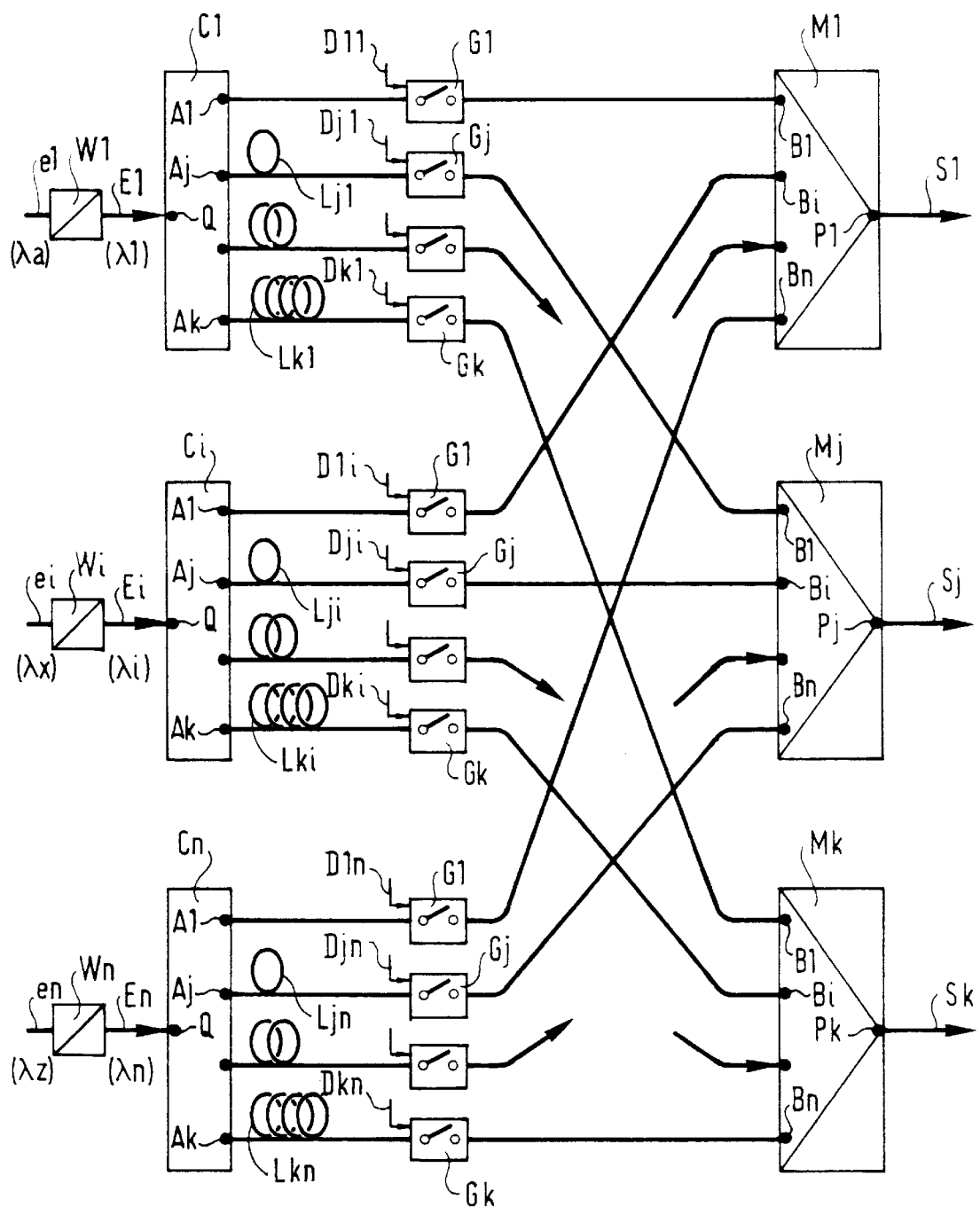
FIG. 2 shows time-division switching apparatus of the invention.

FIG. 2 shows a time-division switching apparatus of structure that is largely identical to that of the above-described space-division switch. The difference relative to the space-division switch lies in the fact that at least k-1 outlets Aj, Ak of each coupler Ci are respectively connected to the inputs B1, Bi, Bn of the multiplexers via delay lines Lj1, Lk1, Lji, Lki, Ljn, Lkn. The lines Lji, Lki that are connected to the same coupler Ci are dimensioned to create propagation delays that are all different.

Thus, as a function of the control signals applied to the various optical gates, any input signal can be directed to one or more outlet ports P1, Pj, Pk with corresponding delays. For example, the signal Sj output by the port Pj of the multiplexer Mj is composed of one or more input signals Ei delayed by delays corresponding to the delay lines Lji.

The gates and the delay lines may placed in any relative positions. However, it is preferable to place the lines upstream from the gates so as to allow additional time for activating the gates.

As with the space-division switch, wavelength converters W1, Wi, Wn may be provided coupled to the inlets Q of the couplers C1, Ci, Cn, the converters being organized such that, as a function of respective external signals e1, ei, en carried by arbitrary wavelengths, they deliver the input signals E1, Ei, En carried respectively by the wavelengths $\lambda 1, \lambda i, \lambda n$ imposed by the multiplexers.

The choice of the delays allocated to the delay lines Lji of the sub-blocks associated respectively with the couplers Ci depends on the context of use. For example, when the input signals E1-En represent binary data organized in packets, each delay line Lji is advantageously dimensioned to procure a delay equal to a whole number of times the propagation time of a packet.

A space-and-time-division switch can be implemented by putting a time-division switch as described above in cascade with a space-division switch as described above, the time-division switch being placed upstream.

By connecting such space-and-time-division switches in parallel and/or in cascade, it is possible to implement space-and-time-division switching matrices. In this context, the delay lines Lji need to be dimensioned by taking into account the data traffic conditions within the matrix.

What is claimed is:

1. A switching apparatus for selectively transmitting n input optical signals to one or more outlet ports as a function of a direction command, said input signals having a form of modulated optical waves that each have a different wavelength, said apparatus comprising:

n passive couplers, each of which is provided with a number of outlets equal to a number k of said outlet ports, and with at least one inlet suitable for receiving one of said input signals; and k wavelength multiplexers, each of which is provided with an outlet constituting one of said outlet ports, and with n inlets set to respective ones of said wavelengths;

wherein for each multiplexer, that one of its inlets which is set to one of said wavelengths is coupled via an amplifying optical gate to one of the outlets of that one of the couplers that is organized to receive an input signal carried by the same wavelength.

2. The switching apparatus according to claim 1, including n wavelength converters suitable for delivering respective ones of said input optical signals as a function of external optical signals having a form of modulated optical waves having arbitrary wavelengths.

3. The switching apparatus according to claim 1, wherein said amplifying optical gates are stabilized-gain amplifiers.

4. The switching apparatus according to claim 1, wherein at least k-1 outlets of each coupler are connected to respective ones of said inlets of the multiplexers via optical delay lines dimensioned to create propagation delays that are all different.

5. The switching apparatus according to claim 4, wherein each delay line is placed so as to connect one of the outlets of a coupler to one of the optical gates.

6. The switching apparatus according to claim 4, wherein, with said input signals being representative of binary data organized in packets, each delay line is dimensioned to procure a delay equal to a whole number of times a propagation time of a packet.

7. A space-and-time-division switch, implemented by putting a time-division switch in cascade with a space-division switch, said space-division switch, for selectively transmitting n input optical signals to one or more outlet ports as a function of a direction command, said input signals having a form of modulated optical waves that each have a different wavelength, and said space-division switch comprising:

n passive couplers, each of which is provided with a number of outlets equal to a number k of said outlet ports, and with at least one inlet suitable for receiving one of said input signals; and k wavelength multiplexers, each of which is provided with an outlet constituting one of said outlet ports, and with n inlets set to respective ones of said wavelengths;

wherein for each multiplexer, that one of its inlets which is set to one of said wavelengths is coupled via an amplifying optical gate to one of the outlets of that one of the couplers that is organized to receive an input signal carried by the same wavelength; and wherein said time division switch includes optical delay lines dimensioned to create propagation delays that are all different, which connect at least k-1 outlets of each coupler to respective ones of said inlets of the multiplexers.

* * * * *